US005623242A

United States Patent [19]

Dawson, Jr. et al.

[11] Patent Number: 5,623,242

[45] Date of Patent: Apr. 22, 1997

[54] PRESCRIPTION REMINDER SYSTEM AND METHOD

[75] Inventors: Howard W. Dawson, Jr., Clifton, Va.; Gregory Bryan, San Diego, Calif.

[73] Assignee: Anteon Corporation, Fairfax, Va.

[21] Appl. No.: 694,832

[22] Filed: Aug. 9, 1996

Related U.S. Application Data

[63] Continuation of Ser. No. 429,078, Apr. 26, 1995, abandoned.

[51] Int. Cl.$^6$ .................... H04Q 1/30

[52] U.S. Cl. .................... 340/311.1; 340/309.15; 340/825.44; 368/10; 379/38; 455/38.1

[58] Field of Search .................... 340/825.06, 825.19, 340/825.36, 825.44, 309.15, 309.4, 311.1; 379/38; 455/38.1, 38.4; 368/1, 10; 364/401 M, 413.02, 413.03

[56] References Cited

U.S. PATENT DOCUMENTS

| | | | |
|---|---|---|---|
| 4,768,177 | 8/1988 | Kehr et al. | 340/309.4 |
| 4,831,562 | 5/1989 | McIntosh et al. | 340/309.15 |
| 4,940,963 | 7/1990 | Gutman et al. | 340/311.11 |
| 4,942,544 | 7/1990 | McIntosh et al. | 340/309.15 |
| 4,970,669 | 11/1990 | McIntosh et al. | 340/309.15 |
| 5,088,056 | 2/1992 | McIntosh et al. | 340/309.15 |
| 5,157,640 | 10/1992 | Backner | 368/10 |
| 5,291,339 | 3/1994 | Chaco | 364/413.02 |
| 5,390,238 | 2/1995 | Kirk et al. | 364/413.02 |
| 5,495,961 | 3/1996 | Maestre | 368/10 |
| 5,521,589 | 5/1996 | Mondrosch et al. | 340/825.44 |
| 5,543,781 | 8/1996 | Ganucheau, Jr. et al. | 340/825.44 |

*Primary Examiner*—Jeffery Hofsass
*Assistant Examiner*—Timothy Edwards, Jr.
*Attorney, Agent, or Firm*—Stuart P. Meyer; Mark C. Terrano

[57] ABSTRACT

A prescription reminder system and method provides patients with paging devices, and uses a database of information about the patients and their prescriptions to generate reminder signals, based on which paging signals are transmitted to the paging devices, causing the paging devices to display reminder messages instructing each patient that it is time to take a dose of a prescribed medication.

7 Claims, 15 Drawing Sheets

PRESCRIPTION REMINDER SYSTEM AND METHOD

This is a continuation of application Ser. No. 08/429,078 filed on Apr. 26, 1995, now abandoned.

37 C.F.R. 1.71 AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office records, but otherwise reserves all copyright rights whatsoever.

BACKGROUND OF THE INVENTION

This invention relates generally to systems and methods of reminding patients when it is time to take medications and specifically to systems and methods by which prescription information is transmitted to and processed by a data center, and corresponding reminder signals are transmitted to a patient's pager device to remind the patient that it is time to take a dose of the prescribed medication.

Prescription noncompliance is a major problem facing health care today. It has been estimated by health care workers that as many as 50% of prescriptions fail to produce desired results because of improper use. A number of factors contribute to noncompliance. Among them are failure to fill a prescription initially, confusion about proper use, lack of easy-to-understand instructions, apathy, forgetfulness, and intentional noncompliance. The problem is most often observed among patients taking multiple medications, patients taking medications with complicated administration schedules, and patients on long term drug therapy regimens. The elderly account for the largest group of such people. They are thought to have more difficulty with compliance because they more often have numerous medications prescribed, may suffer from cognitive decline, and often have physical limitations such as failing eyesight and hearing which may make compliance more difficult. Noncompliance accounts for numerous nursing home admissions and hospitalizations, as well as emergency room and physician office visits. Patients who are noncompliant may suffer adverse drug reactions, relapse into the chronic or acute disease state for which they were being treated, or suffer a new problem. Each year noncompliance results in extremely high economic costs to the health care system as well as productivity losses among the involved health care providers. Noncompliance also results in loss of time and quality of life for the involved patients and their family members.

If there were a means to remind patients, at regular intervals, of specific medications to be taken, the compliance rate could likely be increased among those patients whose reasons for noncompliance include forgetfulness or inability to understand their medication schedule instructions. If the rate of compliance can be increased, cost savings to the health care system should be realized through fewer hospital and nursing home admissions resulting from subtherapeutic regimens, and fewer office visits because patients' symptoms and outcomes will be better controlled. Third-party insurers are particularly sensitive to the problem of noncompliance because they often cover the cost of the medications and all care which may be required when the patient does not comply with the administration instructions. Government-sponsored payors such as Medicare and Medicaid are also sensitive to the problem of noncompliance. If a service could be developed which helps to increase the scheduled medication compliance rate, patients, health care providers, and insurers would all be better off.

None of the known solutions adequately addresses the need for a simple, flexible, inexpensive system and method to remind patients to take medications at the prescribed times of day.

SUMMARY OF THE INVENTION

In accordance with the present invention, patient prescription information is entered and stored in a database; a reminder signal is generated in response to the stored information; and a patient reminder message is transmitted to a patient pager device in response to the reminder signal.

In another aspect of the invention, a pharmacy data terminal accepts as input patient and prescription information; a database subsystem operatively connected with the data terminal processes and stores the patient and prescription information; a reminder signal generator operatively connected to the database subsystem generates a reminder signal corresponding to the prescription information; a paging service central station transmits a reminder message corresponding to the reminder signal; and a patient pager device displays the reminder message.

DETAILED DESCRIPTION OF THE DRAWINGS

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
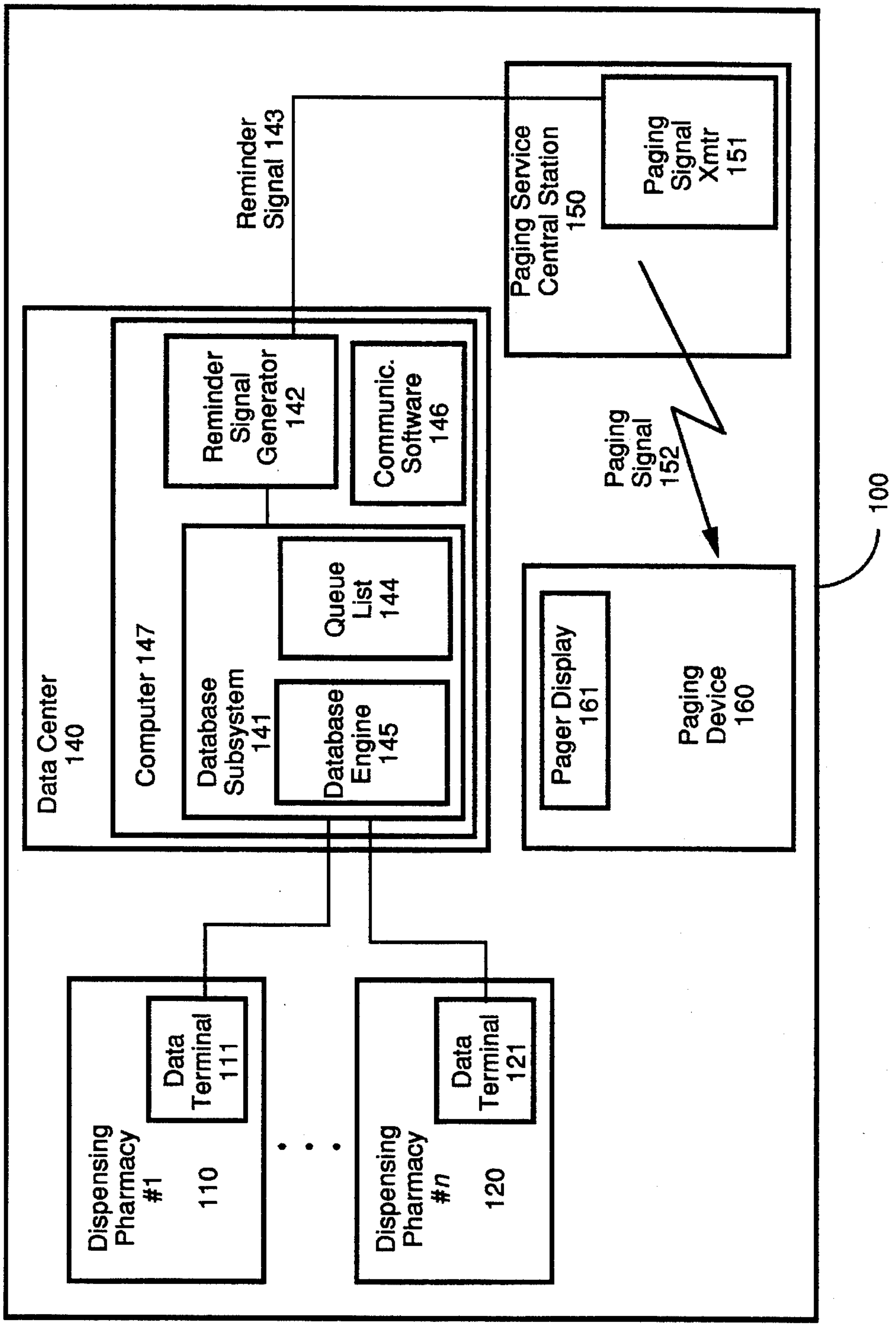
FIG. 1 is a block diagram of a patient reminder system in accordance with the present invention.

Referring now to FIG. 1, there is shown a networked prescription reminder system 100 in accordance with the present invention. The major components of the system 100 include pharmacist data terminals 111, 121 at dispensing pharmacies 110, 120, a database subsystem 141 and reminder signal generator 142 at data center 140, a paging signal transmitter 151, and a pager 160 with an alphanumeric pager display 161.

In operation, a dispensing pharmacist dispenses prescribed medications to a patient from a dispensing pharmacy 110. At the dispensing pharmacy, the prescription information is entered using data terminal 111 and sent, via conventional means such as facsimile or a modem telephone link, to a database subsystem 141 at a data center 140. Database subsystem 141 stores the prescription information and processes the information to determine when, at various times of each day, the patient should be taking a dose of the prescribed medication.

Reminder signal generator 142 accepts text input from database subsystem 141. This text is an ASCII string of characters consisting of the text message that is to be presented on the display 161 of a patient's paging device 160. Reminder signal generator 142 then passes the text into a communications submodule of conventional design which, in the preferred embodiment, opens a data line into paging network service 150. This data line may be a full-time circuit connection, a virtual WAN circuit, or a dial-up telephone line connected with conventional modem circuitry. The reminder signal generator 142 accepts the correct patient pager number (PIN), a unique numerical address having a one-to-one correspondence with the patient's paging device 160, and passes this PIN through to paging network service 150, along with the alphanumeric text message to be shown on display 161 of paging device 160.

Upon acceptance and verification of this alphanumeric pager message, the paging network service 150 acknowledges receipt of the information and the transaction is complete. A note of this acknowledgment is made in the database subsystem 141, and the appropriate database file is updated to reflect the change. Such a process takes only fractions of seconds, other than time needed for communications links. Typically, the overall transaction is completed in a matter of seconds. Conventional paging network service 150 is a conventional text-based messaging system, and directs the patient reminder message to the correct PIN via a widespread virtual network of paging transmitters comprising paging signal transmitter 151. Initial programming of patient information files contains the range of paging transmitters to be activated for a particular patient's paging device, e.g., 160, and this provides the area of service for that pager. For example, if a patient and a corresponding pharmacy is located in San Francisco, Calif., it may be desired to activate only paging transmitters, e.g., 151 in that area with messages intended for that patient. Nationwide coverage may be selected for patients who frequently travel. Selective coverage areas are presently available for conventional paging applications. Similarly, paging systems under development may provide selective coverage limited to a particular geographical area or extending worldwide. For instance, global Low-Earth Orbiting (LEO) satellite systems may provide such coverage. Currently, nationwide coverage is available through, for example, terrestrial-based VHF FM stations located in a nationwide network, and by geostationary satellite resources. Paging transmitter 151 may be implemented using any such technology as is available for other paging applications. In whatever manner of transmission is used, paging signal 152 arrives at paging transmitter 151, and is transmitted to paging device 160, where it is decoded and the corresponding alphanumeric message is displayed.

A queue list 144 within database subsystem 141 is used to keep track of the various events for which reminder signals need to be generated. In a preferred embodiment, database subsystem 141 can store and process prescription information for thousands of patients at a time.

A conventional alphanumeric pager device 160 receives the paging signal 152 and displays, on pager display 161, the alphanumeric reminder message for the patient to see. In a preferred embodiment, an annunciator signal such as a beep or a vibration is provided by pager device 160 to prompt the patient to read the message on pager display 161. Each patient is identified by a unique pager identifier, as is currently practiced for conventional paging systems.

In a preferred embodiment, data terminal 111 is implemented using a conventional personal computer, configured as one of many clients in a client/server architecture wide area network (WAN). In this embodiment, the WAN is virtual, conserving network bandwidth by attaching to computer 147 at data center 140 via conventional dial-up telephone lines or other existing means and communications software 146 only when needed to exchange data. This client/server architecture thus access data center 140 with database subsystem 141. A programmed conventional database engine 145 is used in database subsystem 141. Database system 141, reminder signal generator 142, and communications software 146 are all implemented by programmed computer 147 in data center 140.

Reminder signal generator 142 is driven by data tables in computer 147 and initiates alphanumeric messaging at precise intervals with messages tailored to the patient's needs. Since database subsystem 141 and reminder signal generator 142 generate each message from database table contents that are continuously updated, any changes requested by patients, doctors or pharmacists are reflected immediately in the very next message and subsequent messages. Such "on-the-fly" reconfigurability provides a convenient means for ensuring transmission of accurate and current data without the need for any patient intervention or pharmacy visit. In a preferred embodiment, paging signal transmitter 151 and paging device 160 are conventional components provided by third party commercial remote common carrier (RCC) vendors. It should be recognized that the location and implementation details of the components of system 100 described above may vary significantly in alternate embodiments. As is evident from the above description, a specific advantage of the preferred embodiment is that it provides an inexpensive system by using relatively simple and inexpensive commercially available components.

The nature of the message produced on pager display 161 may vary depending on the medication and the patient. For example, some patients may desire messages that specifically refer to the drug name, such as "12:40 P.M.—It is time to take one Calan pill" while others may desire messages that refer to the function of the medicine, such as "2:30 P.M.—It is time to take one blood pressure pill." The physician or dispensing pharmacist may choose to set a medication schedule that depends not only on the daily frequency of the prescribed medication, but on schedules for other prescribed medications the patient may be taking, the patient's typical meal and sleep times, and other appropriate factors. Thus, a standard prescription of four medication doses per day may actually result in reminder messages being sent at times other than exact 6 hour intervals. Instead, reminder messages may be generated at 7 a.m., noon, 5 p.m. and 11 p.m. Staggered medication regimens are sometimes difficult to indicate on prescription labels, but are simple to implement using system 100.

Figure 2:
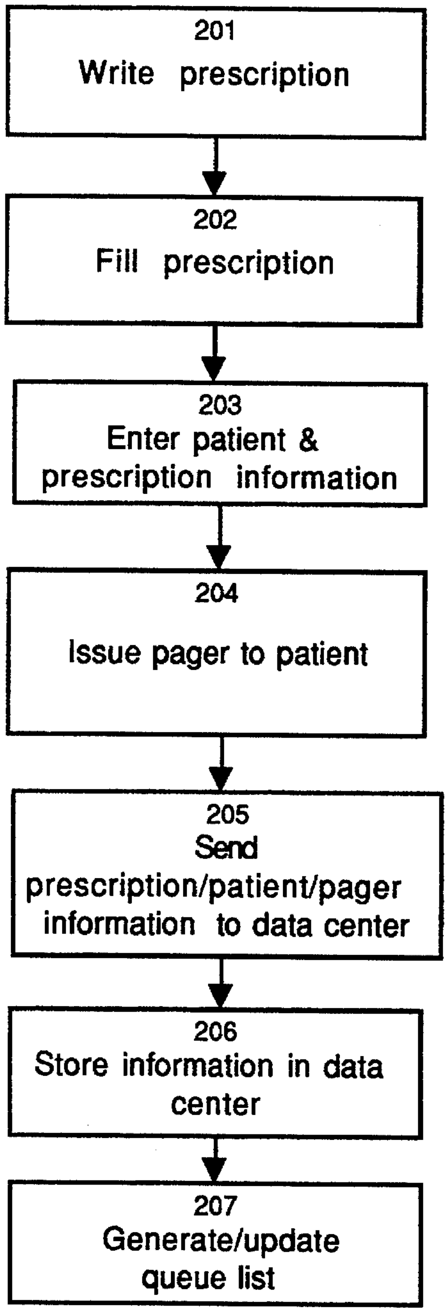
FIG. 2 is a flow diagram of intake processing in accordance with the present invention.

Referring now to FIG. 2, there is shown a flow diagram of intake processing in accordance with the present invention. A physician writes 201 a prescription, which is then filled 202. Information about the prescription and the patient is entered 203 into system 100, e.g., using data terminal 111. If the patient is seeking to have an existing prescription refilled, there may be no need for the physician to write a prescription 201 and intake may begin with the prescription being filled 202. The patient is issued 204 a pager, unless the patient already has one from a previous prescription, and information to identify the pager, as well as the prescription and patient information entered in 203, is sent 205 to data center 140. In a preferred embodiment the information is automatically sent 205 using the components described above in connection with FIG. 1. In other embodiments other methods of data linking and transmission, including shared/leased lines, VSAT, RF links, LANs, dedicated WANs, and the like may be employed, as may be more simplistic procedures, such a fax of an intake data sheet or even a telephone call. This information is stored 206 in database subsystem 141, and a queue list of events is generated or updated 207. The queue list 144 generated by database subsystem 141 is a chronological listing of the upcoming reminder messages generated by the database subsystem 141, and is able to be updated or replaced in a flexible and time-responsive manner by the database engine 145 as needed up to the moment of transmission to reminder signal generator 142. If the patient is a new patient, all of the information concerning the patient may be stored 206; if the patient is recognized by database subsystem 141 as an existing patient, only the new prescription information and perhaps a new pager identifier may need to be stored 206. In some instances, patient information may change and need to be updated, and this information is also processed in the same manner as described above. Examples of the types of information that may be entered and stored for new and existing patients are indicated in Table I below:

TABLE I

| Patient/Prescription/Pager Information |
|---|
| New Patient Demographics: |
| Patient Name |
| Patient Insurance Company Name |
| Patient ID # |
| Patient Insurance Company Group # |
| Patient Address |
| Patient Phone # |
| Pager # |
| Update Patient Demographics: |
| Patient Name (and changes thereto) |
| Patient Insurance Company Name (and changes thereto) |
| Patient ID # (and changes thereto) |
| Patient Address (and changes thereto) |
| Patient Phone # (and changes thereto) |
| Pager # (and changes thereto) |
| New Prescriptions |
| Patient Name |
| Patient Insurance Company Name |
| Patient ID # |
| Pharmacy Name |
| Pharmacy Address |
| Pharmacy Phone # |
| Physician Name |
| Physician Address |
| Physician Phone # |
| Prescription Information (separate entries for each prescription if multiple prescriptions) |
| RX # |
| Drug Trade Name |
| Drug Generic Name |
| Drug Synonym (e.g., "blue pill," "blood pressure pill") |
| Schedule (eg., QID, every 4 hours, at bedtime) |
| Number of pills dispensed |
| Updated Prescriptions |
| Patient Name |
| Patient Insurance Company Name |
| Patient ID # |
| Pharmacy Name (and changes thereto) |
| Pharmacy Address (only if changed) |
| Pharmacy Phone # (only if changed) |
| Physician Name (only if changed) |
| Physician Address (only if changed) |
| Physician Phone # (only if changed) |
| Prescription Information (separate entries for each prescription if multiple prescriptions) |
| RX # (and changes thereto) |
| Drug Trade Name (only if changed) |
| Drug Generic Name (only if changed) |
| Drug Synonym (only if changed) |
| Schedule (only if changed) |
| Number of pills dispensed (only if changed) |

As in conventional database systems, prescription and patient information may be purged when it is no longer needed.

Figure 3:
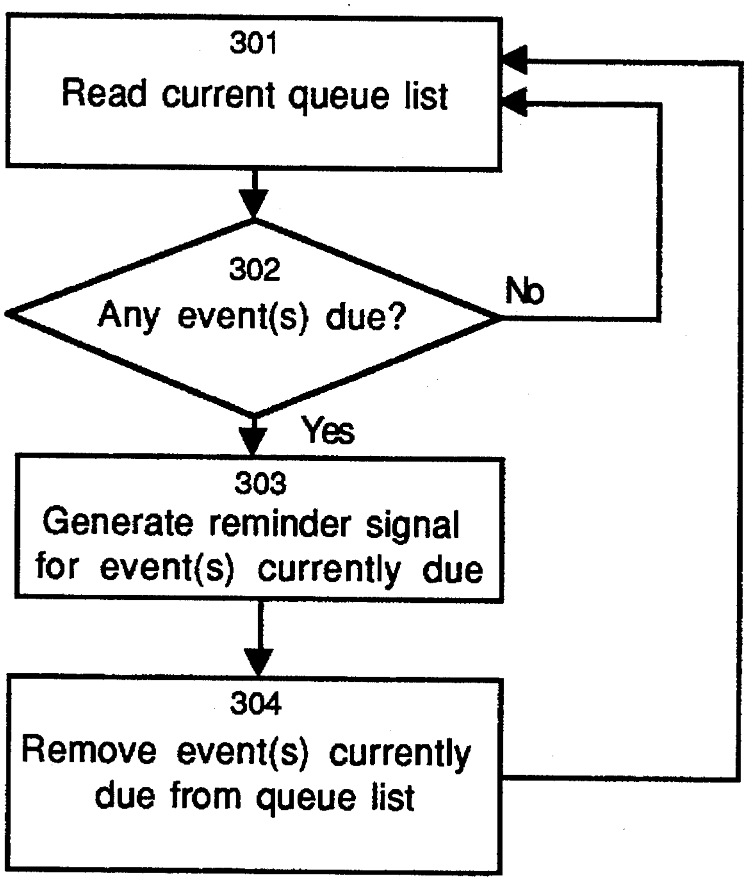
FIG. 3 is a flow diagram of reminder signal processing in accordance with the present invention.

Referring now to FIG. 3, there is shown a flow diagram of reminder signal generation in accordance with the present invention. Processing commences by reading 301 the current queue list. A check 302 is then made to determine whether any of the events on the queue list 302 are currently due for processing. In other words, check 302 is used to determine whether it is time to generate a reminder for any of the stored prescriptions. If not, processing returns to 301. If one or more events is due, a reminder signal is generated 303 for each of those events, and those events are then removed 304 from the queue list 144. Processing then returns to 301 so that the next events may be processed.

In an alternate embodiment of the invention, reminders messages are also sent when, according to the prescription schedule, the patient should be running low on medications and the medications should be refilled. Other messages relating to the prescription, such as "REMINDER—MEDS MUST BE CONTINUED EVEN IF SYMPTOMS DISAPPEAR" may also be sent if desired. Some patients may already have pagers for other uses, e.g., in connection with their employment. Especially where the prescribed medications are for a chronic condition, such as hypertension, system 100 can be configured to transmit a message to the pager that the patient is already using for other purposes. In yet another embodiment, pager device 160 is configured with conventional voice synthesis circuitry so that the patient is provided with an audible message in addition to or instead of displaying such a message on pager display 161. In still another embodiment of the invention, the system may be extended to further include a medication-dispensing device that stores the prescribed medication and dispenses the dose to be taken upon receiving the paging signal.

Figure 4:
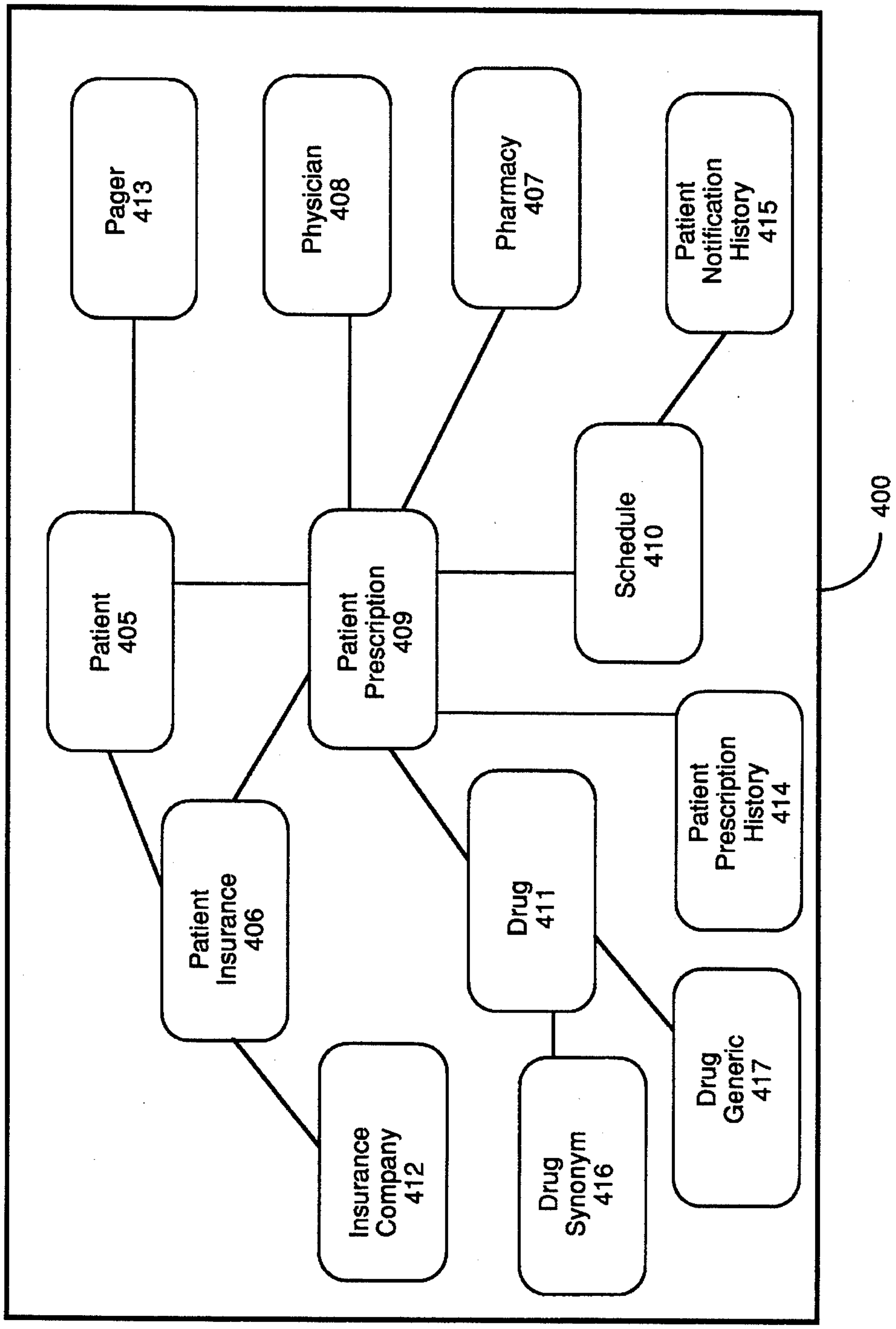
FIG. 4 illustrates a database design in accordance with the present invention.

Referring now to FIG. 4, there is shown a database design 400 in accordance with the present invention. Information organized according to database design 400 is provided and examined using a data terminal, e.g., 111, and such information is also processed as described above in connection with database subsystem 141. Design 400 comprises the following data structures: patient data structure 405, patient insurance data structure 406, pharmacy data structure 407, physician data structure 408, patient prescription data structure 409, schedule structure 410, drug structure 411, insurance company structure 412, pager structure 413, patient prescription history structure 414, patient notification history structure 415, drug synonym structure 416, and drug generic structure 414. These structures are related to one another as indicated in FIG. 4. Specifically, patient prescription data relates to patient data, physician data, pharmacy data, schedule data, patient prescription history data, drug data, and patient insurance data. patient data also relates directly to patient insurance data and pager data. Patient insurance data also relates to insurance company data. Drug data also relates to drug synonym data and drug generic data. Schedule data also relates to patient notification history data. Thus, the corresponding data structures 405–417 are related as shown in FIG. 4. These individual structures and their relationships may be implemented in any conventional manner as desired for operation of system 100. In a preferred embodiment, user interface screens or reports are associated with these data structures, as exemplified in FIGS. 5–17.

In one embodiment, database design 400 with data structures 405–417 is implemented using the data structure elements and characteristics indicated in Table II below:

TABLE II

| PRESCRIPTION REMINDER NETWORK DATABASE |
|---|
| PATIENT PRESCRIPTION |
| Prescription ID Number |
| Patient ID Number |
| Insurance Company ID Number |
| Insurance Company Authorization Number |
| Physician ID Number |
| Prescription Number (RX) |
| Drug Trade name ID Number |
| Drug Generic ID Number |
| Drug Synonym ID Number |
| Schedule ID Number |
| Unique Patient Message |
| Dosage Type (Pill, Liquid, etc.) |
| Dosage Quantity per Use (1, 2, 3, etc.) |
| Dosage Unit of Use (each, teaspoon, tablespoon, etc.) |
| Number of Dosage Units of Drug Dispensed |
| Entry User ID |
| Entry Date |
| PATIENT NOTIFICATION HISTORY |
| Notification History ID Number |
| Prescription ID Number |
| Notification Date and Time |
| Entry User ID |
| Entry Date |
| PATIENT PRESCRIPTION HISTORY |
| Prescription ID Number |
| Patient ID Number |
| Insurance Company ID Number |
| Insurance Company Authorization Number |
| Physician ID Number |
| Prescription Number (RX) |
| Drug Trade name ID Number |
| Drug Generic ID Number |
| Drug Synonym ID Number |
| Schedule ID Number |
| Unique Patient Message |
| Dosage Type (Pill, Liquid, etc.) |
| Dosage Quantity per Use (1, 2, 3, etc.) |
| Dosage Unit of Use (each, teaspoon, tablespoon, etc.) |

TABLE II-continued

| PRESCRIPTION REMINDER NETWORK DATABASE |
|---|
| Number of Dosagd Units of Drug Dispensed |
| Entry User ID |
| Entry Date |
| PATIENT |
| Patient ID Number |
| Patient First Name |
| Patient Middle Name |
| Patient Last Name |
| Patient Suffix Name |
| Patient Address 1 |
| Patient Address 2 |
| Patient Address 3 |
| Patient City |
| Patient State |
| Patient ZIP 1 |
| Patient ZIP 2 |
| Patient Work Phone |
| Patient Home Phone |
| Patient Pager Phone Number |
| Patient Pager ID Number |
| Entry User ID |
| Entry Date |
| PATIENT INSURANCE |
| Patient ID Number |
| Patient Primary Insurance Company ID Number |
| Patient Primary Insurance Company Group Number |
| Patient Secondary Insurance Company ID Number |
| Patient Secondary Insurance Company Group Number |
| Entry User ID |
| Entry Date |
| INSURANCE COMPANY |
| Insurance Company ID Number |
| Insurance Company Address 1 |
| Insurance Company Address 2 |
| Insurance Company Address 3 |
| Insurance Company City |
| hisurance Company State |
| Insurance Company ZIP 1 |
| Insurance Company ZIP 2 |
| Entry User ID |
| Entry Date |
| PAGER |
| Pager ID Number |
| Pager Manufacturer Name |
| Pager Serial Number |
| Entry User ID |
| Entry Date |
| PHARMACY |
| Pharmacy ID Number |
| Pharmacy Name |
| Pharmacy Address 1 |
| Pharmacy Address 2 |
| Pharmacy Address 3 |
| Pharmacy City |
| Pharmacy State |
| Pharmacy ZIP 1 |
| Pharmacy ZIP 2 |
| Pharmacy Phone |
| Entry User ID |
| Entry Date |
| PHYSICIAN |
| Physician ID Number |
| Physician First Name |
| Physician Middle Name |
| Physician Last Name |
| Physician Suffix Name |
| Physician Address 1 |
| Physician Address 2 |
| Physician Address 3 |
| Physician City |

TABLE II-continued

| PRESCRIPTION REMINDER NETWORK DATABASE |
| --- |
| Physician State |
| Physician ZIP 1 |
| Physician ZIP 2 |
| Physician Office Phone |
| Entry User ID |
| Entry Date |
| DRUG |
| Drug ID Number |
| Drug Trade Name |
| Entry User ID |
| Entry Date |
| DRUG GENERIC |
| Drug Generic ID Number |
| Drug Generic Name |
| Drug Trade Name ID Number |
| Entry User ID |
| Entry Date |
| DRUG SYNONYM |
| Drug Synonym ID Number |
| Drug Synonym Name |
| Drug Trade name ID Number |
| Entry User ID |
| Entry Date |
| SCHEDULE |
| Schedule ID Number |
| Schedule Time |
| Schedule Frequency Daily |
| Schedule Message |
| Entry User ID |
| Entry Date |

It should be recognized that the elements recited above may be of various data types as required, e.g., text, numeric, time/date. It should also be recognized that some of the elements recited above be required for any transaction, e.g., Patient ID Number, while others may be used in some situations and not used in others.

Figure 5:
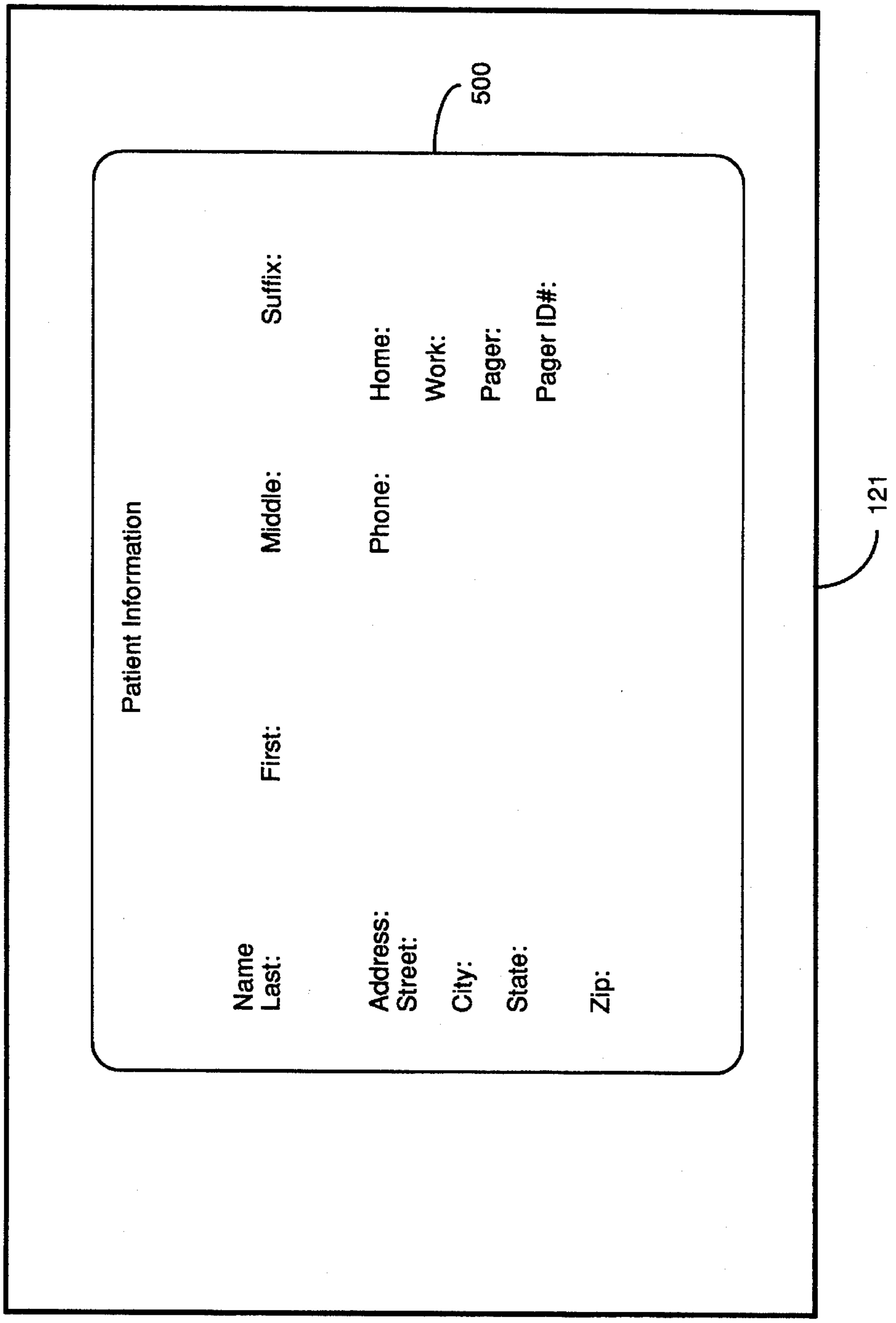
FIG. 5 is a user interface display for patient information in accordance with the present invention.

Referring now to FIG. 5, there is shown a patient information user interface screen 500. Screen 500 is displayed on a data terminal, e.g., 121, in a pharmacy, e.g., 120, and allows entry and review of identifying information concerning a particular patient.

Figure 6:
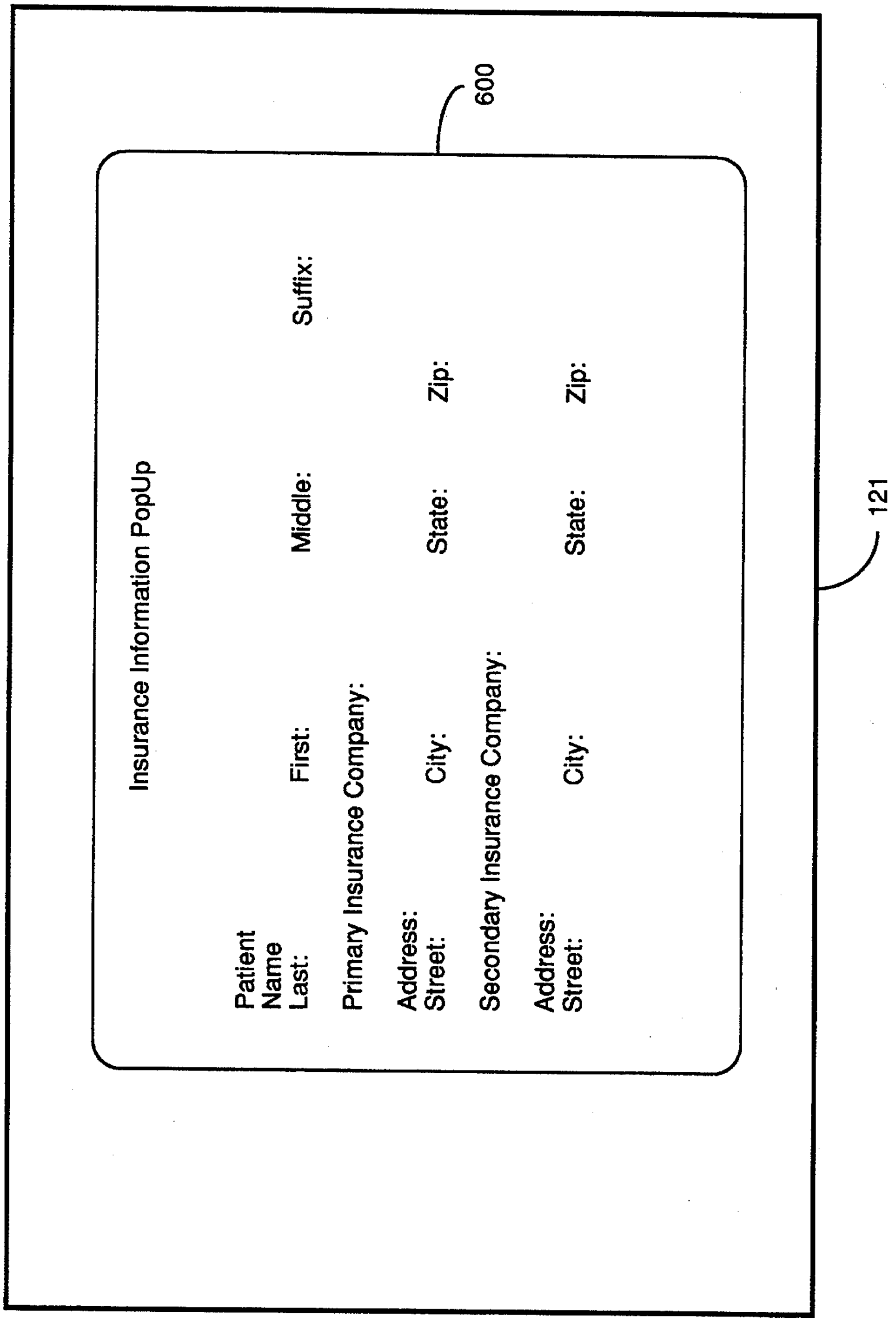
FIG. 6 is a user interface display for insurance information in accordance with the present invention.

Referring now to FIG. 6, there is shown an insurance information user interface screen 600. Screen 600 is displayed on a data terminal, e.g., 121, in a pharmacy, e.g., 120, and allows entry and review of insurance information concerning a particular patient. In one embodiment, a separate user interface screen (not shown) is used for initial input of insurance company name and address information. It should be recognized that such information may be re-used as needed with various patients rather than being re-entered every time it is needed.

Figure 7:
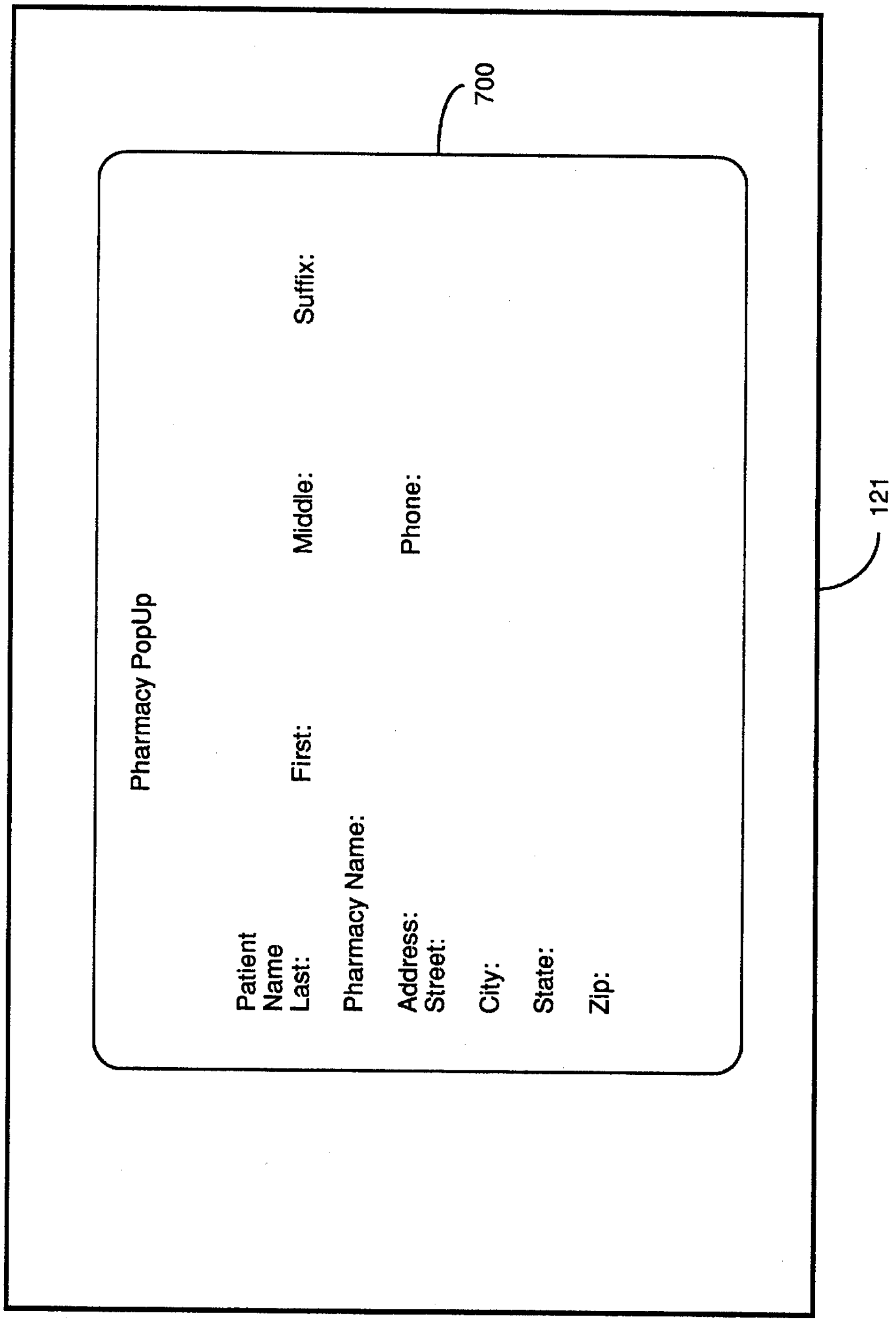
FIG. 7 is a user interface display for pharmacy information in accordance with the present invention.

Referring now to FIG. 7, there is shown a pharmacy information user interface screen 700. Screen 700 is displayed on a data terminal, e.g., 121, in a pharmacy, e.g., 120, and allows entry and review of pharmacy information concerning a particular patient. In one embodiment, a separate user interface screen (not shown) is used for initial input of pharmacy name and address information. It should be recognized that such information may be re-used as needed with various patients rather than being re-entered every time it is needed.

Figure 8:
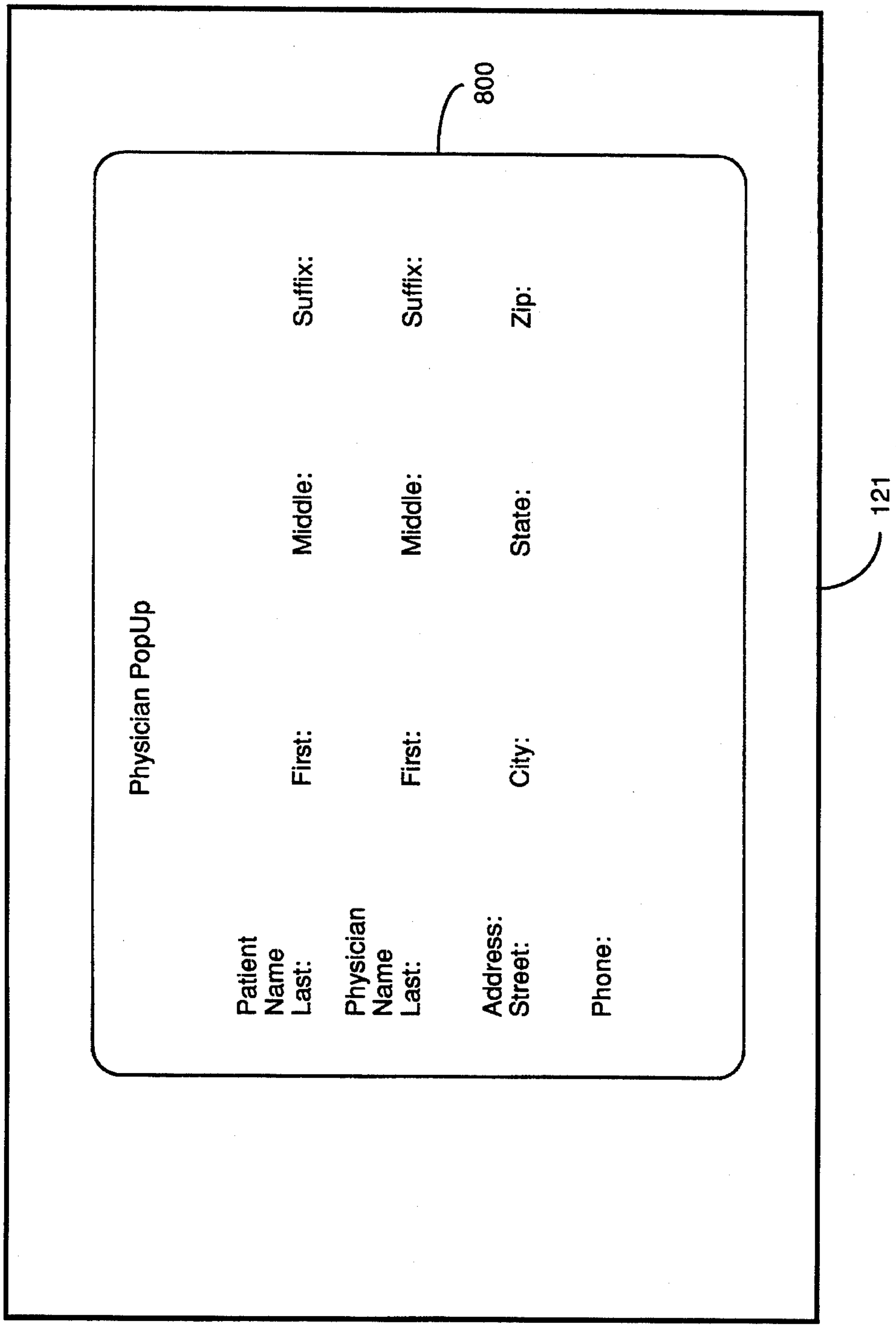
FIG. 8 is a user interface display for physician information in accordance with the present invention.

Referring now to FIG. 8, there is shown a physician user interface screen 800. Screen 800 is displayed on a data terminal, e.g., 121, in a pharmacy, e.g., 120, and allows entry and review of physician information concerning a particular patient. In one embodiment, a separate user interface screen (not shown) is used for initial input of physician name and address information. It should be recognized that such information may be re-used as needed with various patients rather than being re-entered every time it is needed.

Figure 9:
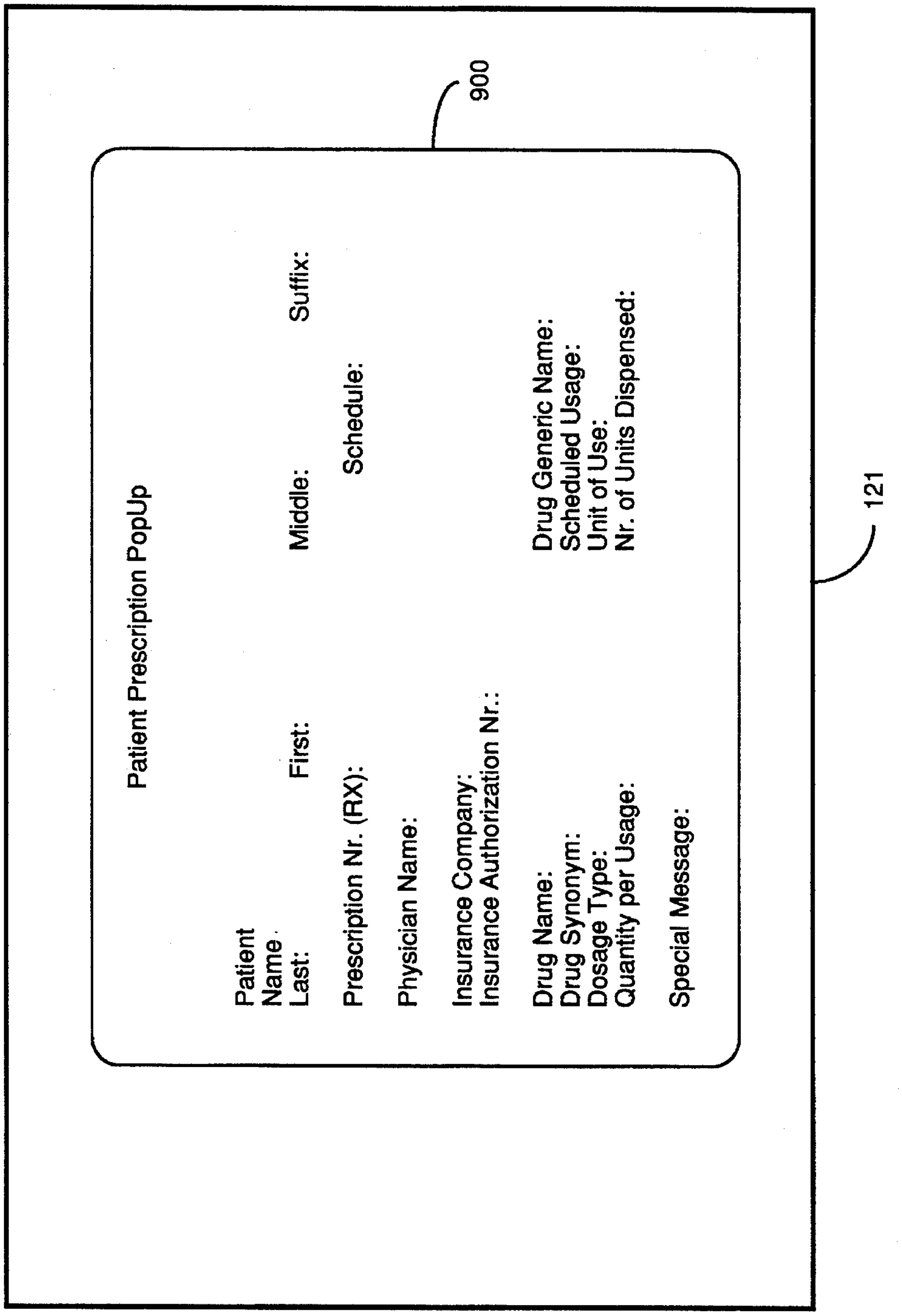
FIG. 9 is a user interface display for patient prescription information in accordance with the present invention.

Referring now to FIG. 9, there is shown a patient prescription user interface screen 900. Screen 900 is displayed on a data terminal, e.g., 121, in a pharmacy, e.g., 120, and allows entry and review of patient prescription information, including patient and physician name, the prescription number and schedule, insurance company and drug information, and any special message as may be desired.

Figure 10:
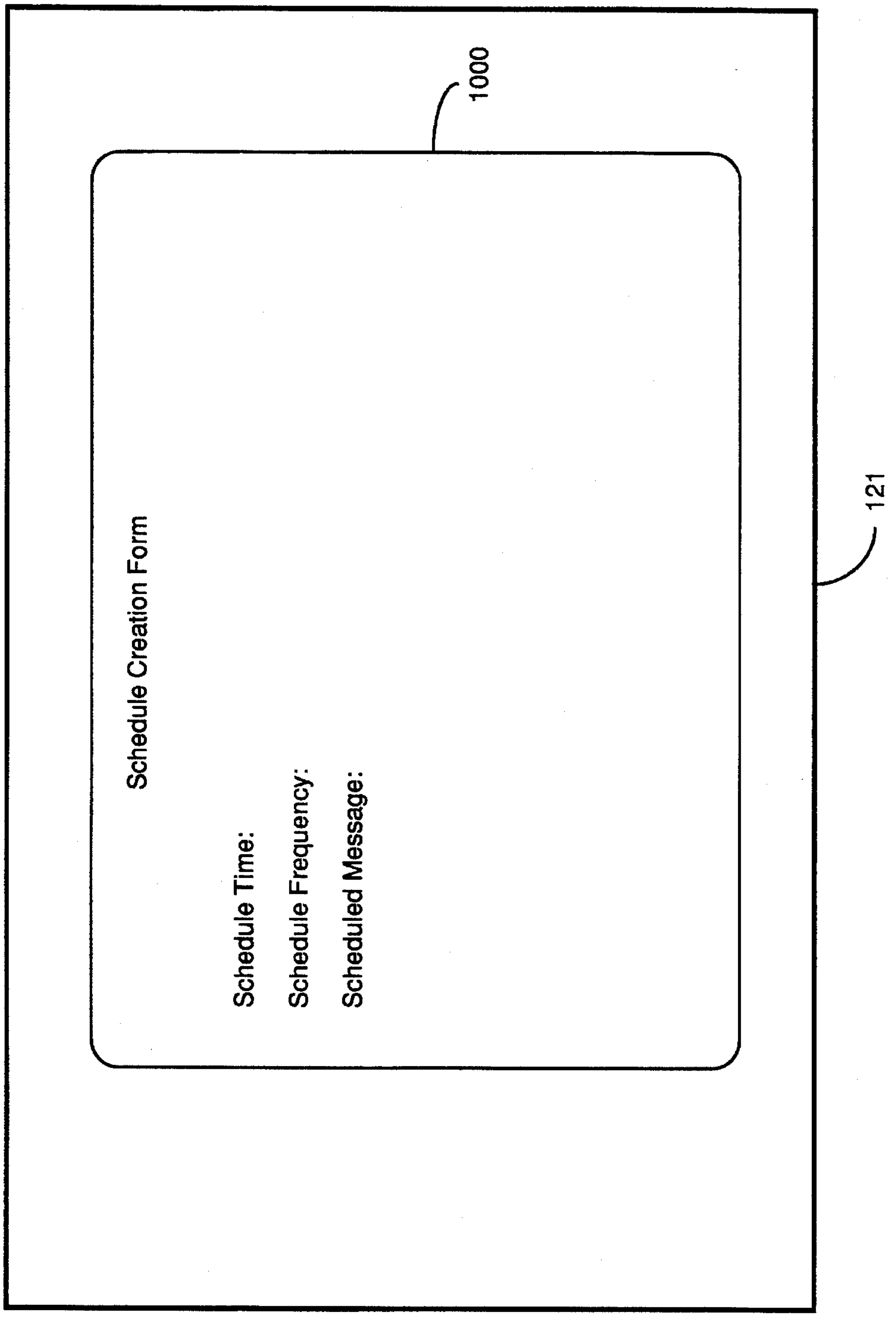
FIG. 10 is a user interface display for schedule information in accordance with the present invention.

Referring now to FIG. 10, there is shown a schedule creation form user interface screen 1000. Screen 1000 is displayed on a data terminal, e.g., 121, in a pharmacy, e.g., 120, and allows entry and review of schedule information, concerning a particular prescription, including the scheduled message to be shown on pager display 161.

Figure 11:
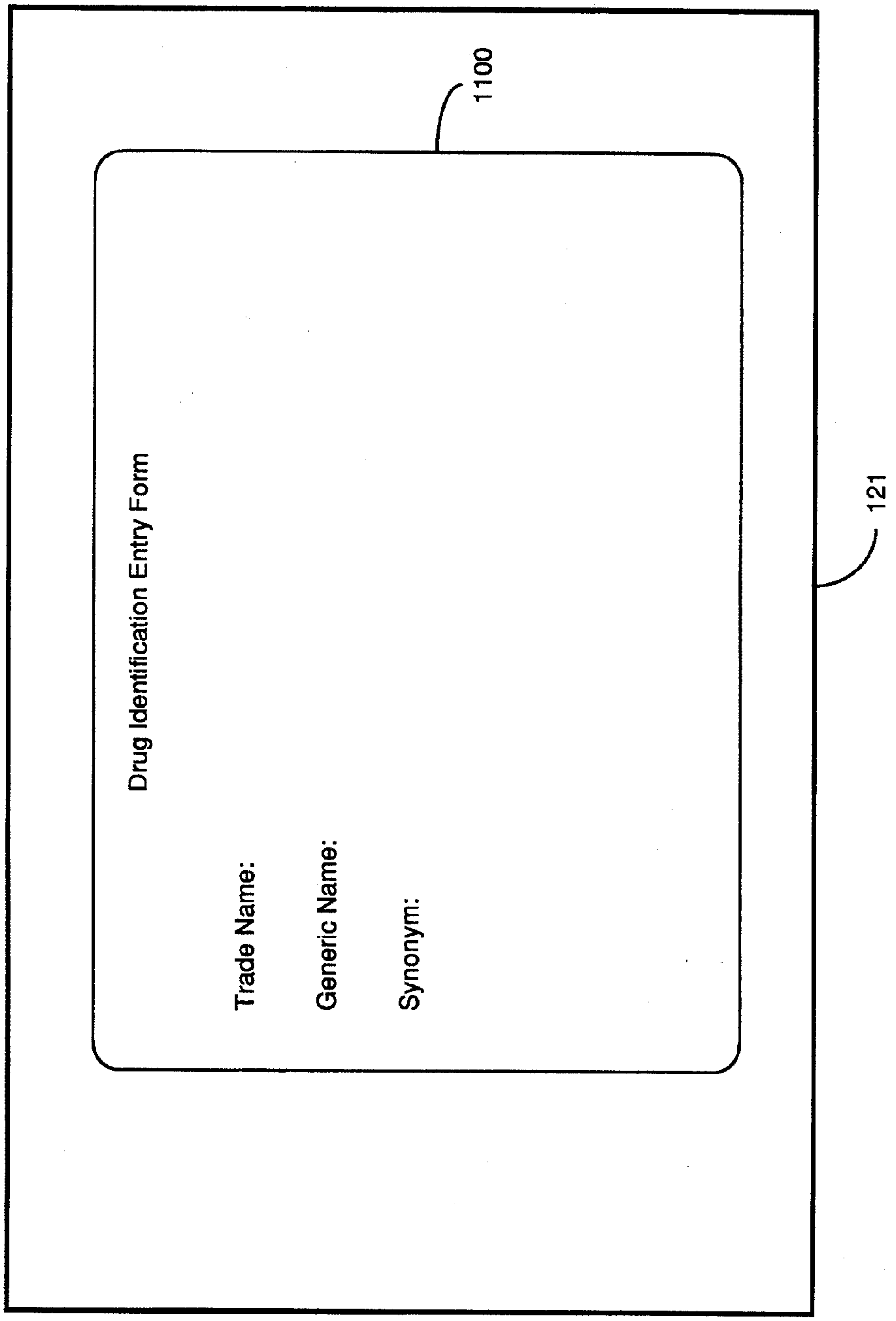
FIG. 11 is a user interface display for drug identification information in accordance with the present invention.

Referring now to FIG. 11, there is shown a drug identification entry form user interface screen 1100. Screen 1100 is displayed on a data terminal, e.g., 121, in a pharmacy, e.g., 120, and allows entry and review of information concerning a particular drug.

Figure 12:
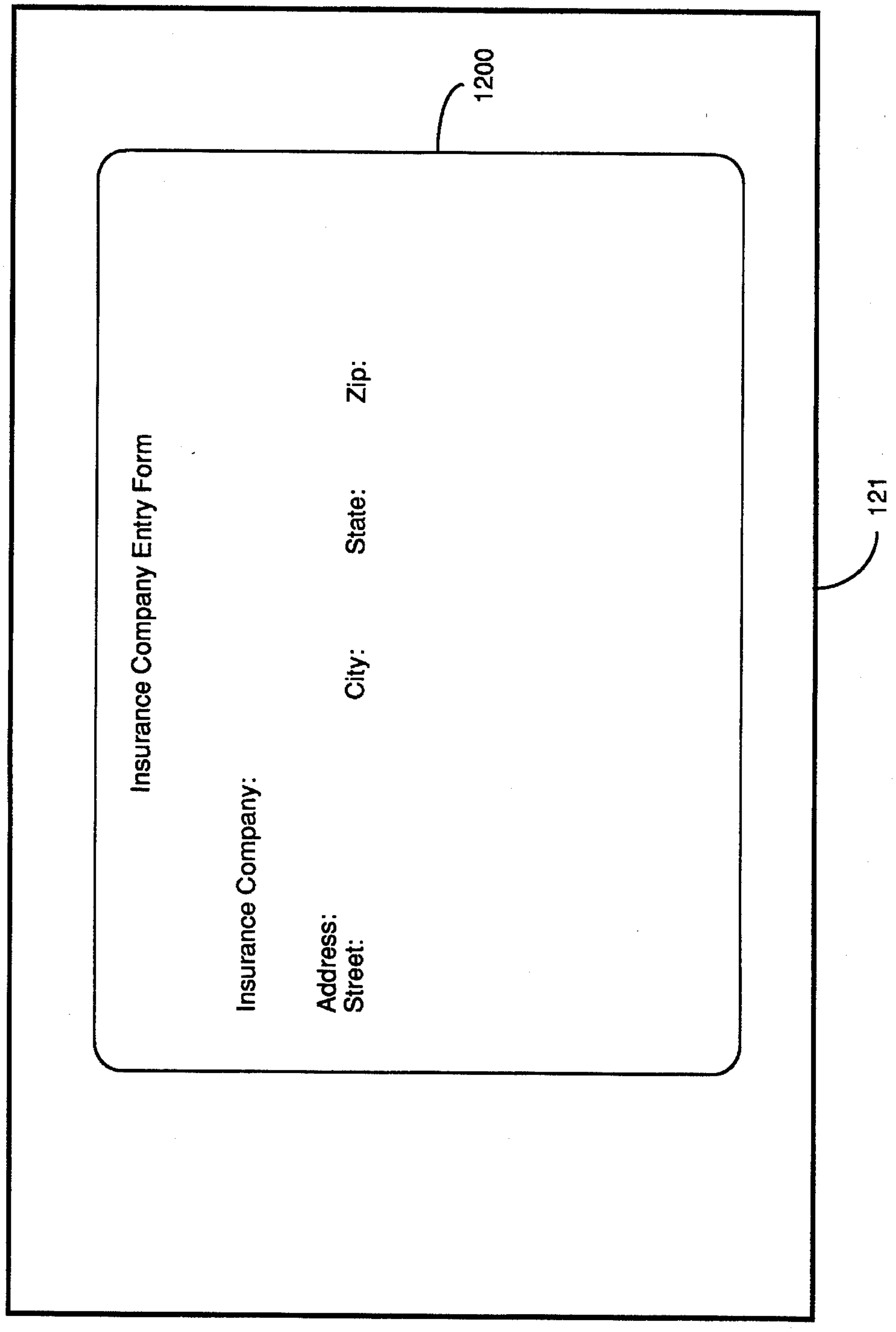
FIG. 12 is a user interface display for insurance company information in accordance with the present invention.

Referring now to FIG. 12, there is shown an example of an insurance company entry form user interface screen 1200 as mentioned above in connection with FIG. 6. Screen 1200 is displayed on a data terminal e.g., 121, in a pharmacy, e.g., 120, and allows entry and review of information concerning an insurance company.

Figure 13:
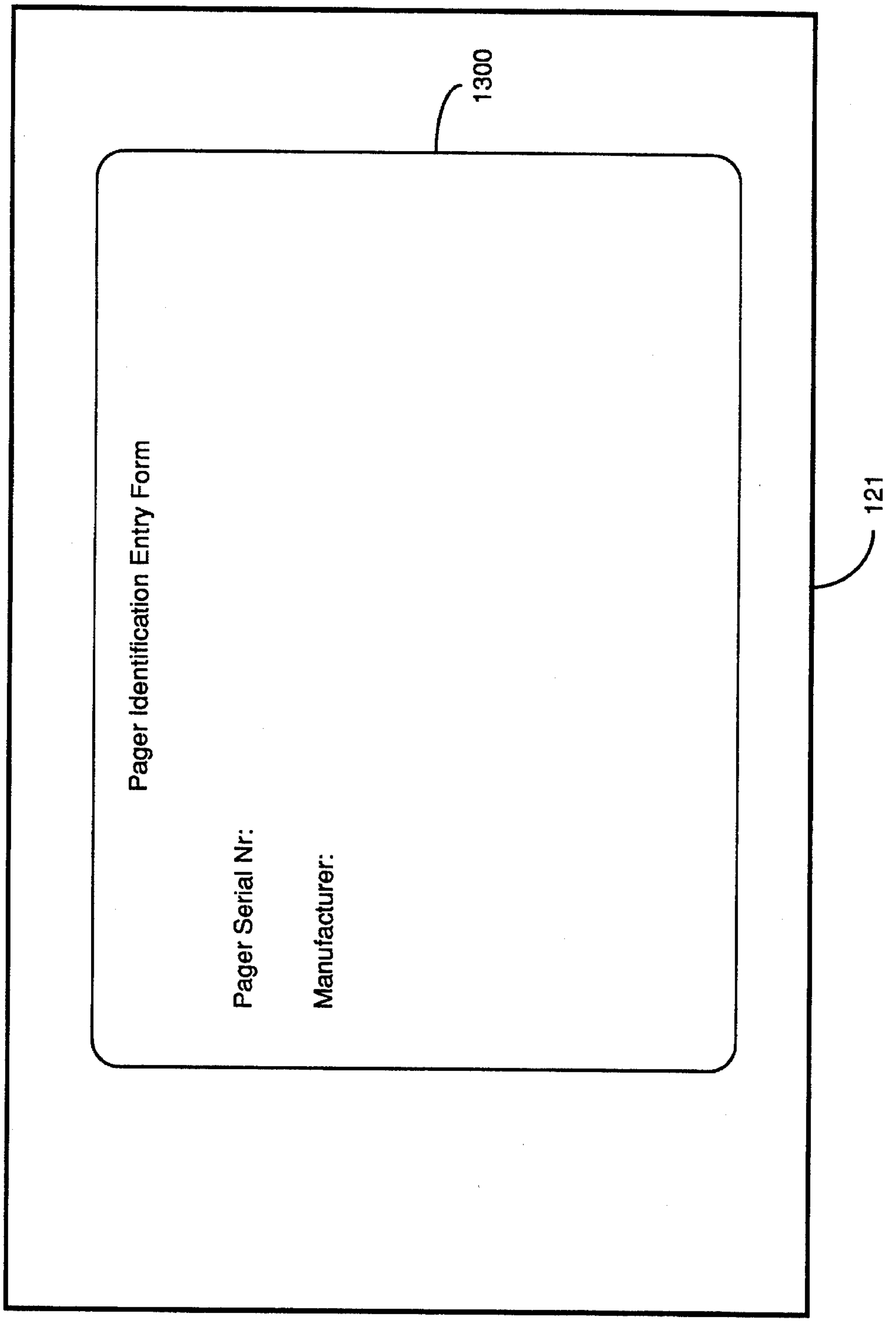
FIG. 13 is a user interface display for pager identification information in accordance with the present invention.

Referring now to FIG. 13, there is shown an example of a pager identification entry form user interface screen 1300. Screen 1300 is displayed on a data terminal, e.g., 121, in a pharmacy, e.g., 120, and allows entry and review of pager identification information.

Figure 14:
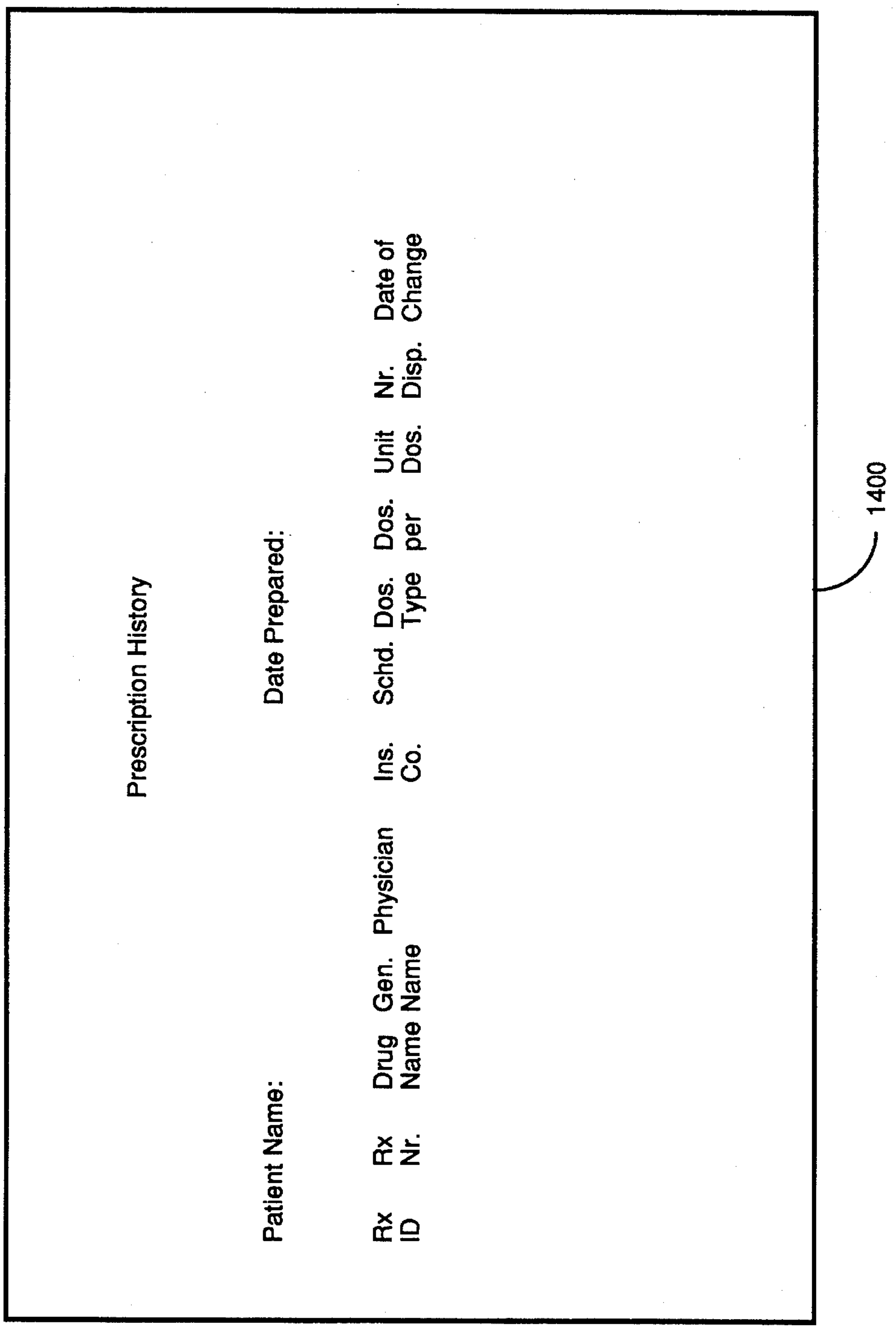
FIG. 14 is a prescription history report in accordance with the present invention.

Referring now to FIG. 14, there is shown an example of a prescription history report 1400. Report 1400 may be displayed on a data terminal, e.g., 121, in a pharmacy, e.g., 120, or alternatively may be printed and retained as a hard-copy prescription record. Report 1400 includes columns for information concerning a prescription ID, a prescription number, a drug name, a generic drug name, a physician, an insurance company, a schedule, a dosage type, a dosage per use, a unit dosage, a number dispensed, and a date of change.

Figure 15:
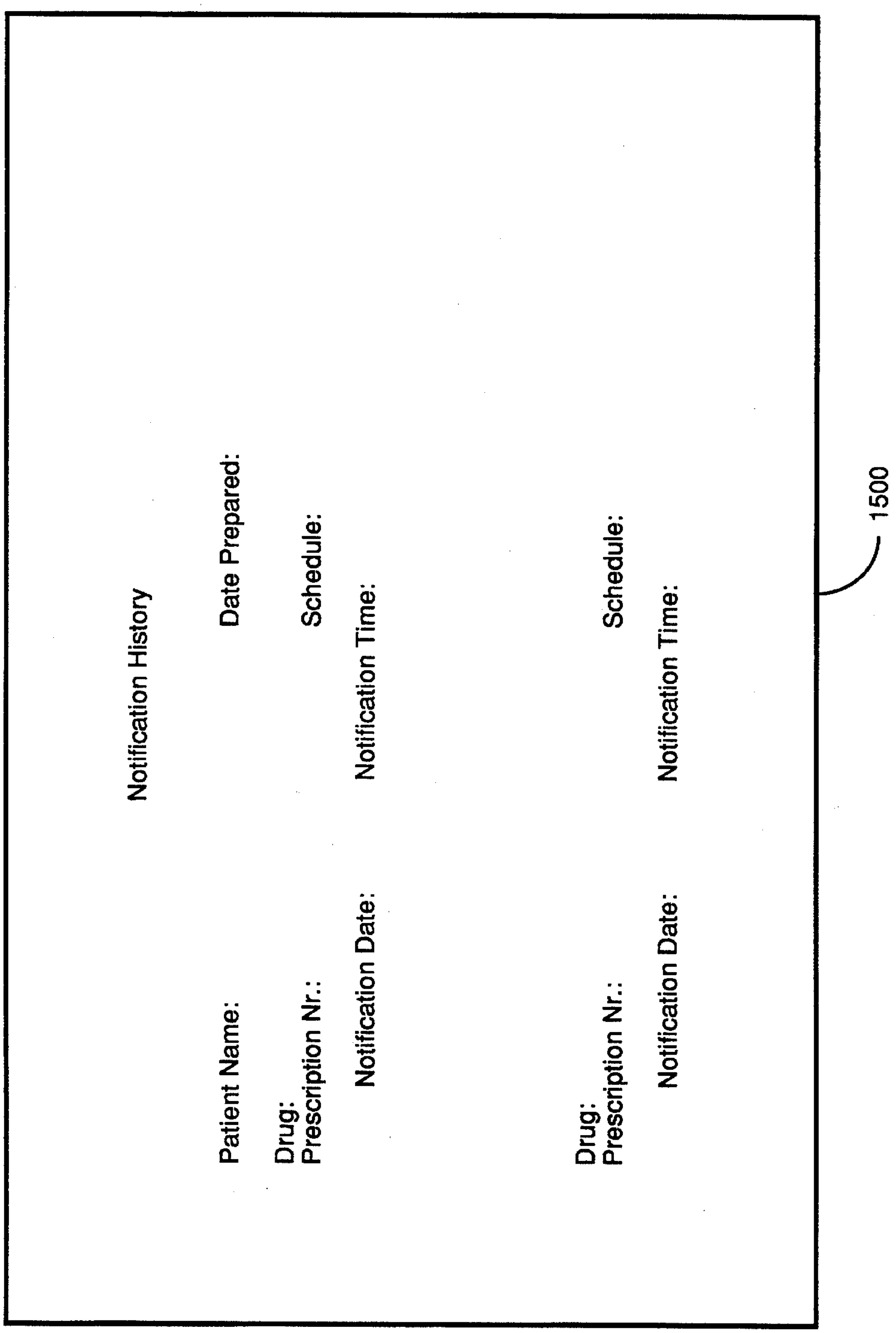
FIG. 15 is a notification history report in accordance with the present invention.

Referring now to FIG. 15, there is shown an example of a notification history report 1500. Report 1500 may be displayed on a data terminal, e.g., 121, in a pharmacy, e.g., 120, or alternatively may be printed and retained as a hard-copy prescription record. Report 1500 provides a record of patient notifications using system 100, including information on patient name, the date the history for that patient was prepared, the drug and prescription number, the schedule, and each of the dates and times that notification was made to the patient using system 100.

From the above description, it will be apparent that the invention disclosed herein provides a novel and advantageous prescription reminder system and method using patient reminder messages transmitted to patient pager devices. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A prescription reminder system, comprising:

a first data terminal into which patient and prescription information is entered;

a database subsystem communicating with the data terminal and accepting as input from said first data terminal signals corresponding to said patient and prescription information, the database subsystem disposed remotely from said first data terminal;

a reminder signal generator, operatively coupled to the database subsystem and configured to generate reminder signals responsive to the patient and prescription information;

a paging signal transmitter, operatively coupled to the reminder signal generator and configured to transmit a paging signal responsive to the reminder signal to convey to a patient information concerning a prescription, the paging signal transmitter being disposed remotely from where said patient may comply with said prescription; and a portable patient pager device configured to receive the paging signal and to convey to said patient said information concerning said prescription.

2. A system as in claim 1, wherein the information concerning a prescription is a message that a dose of medication is due to be taken, and wherein the patient pager device displays the message.

3. A system as in claim 1, wherein the first data terminal is disposed at a dispensing pharmacy, and wherein the database subsystem and reminder signal generator are disposed at a data center remotely located from the dispensing pharmacy.

4. A system as in claim 1, wherein the first data terminal is disposed at a first location, the system further comprising a second data terminal, disposed at a second location different from the first location, wherein the second data terminal is used to modify the patient and prescription information.

5. A method of providing prescription reminders for a patient, comprising:

storing patient and prescription information in a database;

generating reminder signals in response to the patient and prescription information;

transmitting paging signals in response to the reminder signals, said transmitting taking place remotely from where said patient is to comply with said prescription reminder;

receiving the transmitted paging signals by a portable patient pager device; and conveying the prescription reminders to the patient in response to receipt of the transmitted pager signals by the patient pager device, including displaying alphanumeric prescription reminder messages on a pager display of the patient pager device.

6. A method as in claim 5, wherein the database is stored in equipment disposed at a first location, further comprising entering the patient and prescription information at a second location and transmitting the patient and prescription information from the second location to the first location.

7. A method as in claim 5, further comprising modifying the patient and prescription information from a third location.

* * * * *